United States Patent
Schuchardt (10) Patent No.: US 6,260,643 B1
(45) Date of Patent: Jul. 17, 2001

(54) CART PULLER WITH RETAINING CORD MECHANISM

(75) Inventor: Peter W. Schuchardt, Stillwater, MN (US)

(73) Assignee: Rhino Craft, Inc., Wyoming, MN (US)

( * ) Notice: Subject to any disclaimer, the term of this patent is extended or adjusted under 35 U.S.C. 154(b) by 0 days.

(21) Appl. No.: 09/419,860

(22) Filed: Oct. 19, 1999

Related U.S. Application Data (60) Provisional application No. 60/138,434, filed on May 18, 1999.

(51) Int. Cl.$^7$ ................................................. B62D 53/00
(52) U.S. Cl. .................. 180/14.1; 180/19.1; 280/33.991
(58) Field of Search ................................. 180/14.1, 19.1, 180/65.1; 280/33.991, 33.992; 242/384.7, 382, 604, 604.1

(56) References Cited

U.S. PATENT DOCUMENTS

| | | | |
|---|---|---|---|
| 2,181,141 | * 11/1939 | Lovegran | 242/384.7 |
| 2,547,777 | * 4/1951 | Ray | 242/384.7 |
| 2,838,190 | * 6/1958 | Stevens | 242/384.7 |
| 3,952,966 | * 4/1976 | Burleigh | 242/384.7 |
| 4,192,473 | * 3/1980 | Wellman | 242/604 |
| 5,082,074 | * 1/1992 | Fischer | 280/33.991 |
| 5,322,306 | * 6/1994 | Coleman | 280/33.991 |
| 5,791,669 | * 8/1998 | Broddon et al. | 280/33.992 |
| 5,860,485 | * 1/1999 | Ebbenga | 280/33.991 |
| 5,934,694 | * 8/1999 | Schugt et al. | 280/33.991 |

FOREIGN PATENT DOCUMENTS

2350308 * 4/1975 (DE) ............................... 280/33.991

* cited by examiner

Primary Examiner—Daniel G. DePumpo
(74) Attorney, Agent, or Firm—Kinney & Lange, P.A.

(57) ABSTRACT

A cart pulling system for pulling a line of nested carts including a reelable retaining cord mechanism and a hitch to engage the line of nested carts. The reelable retaining cord mechanism is a dual spindle system which is attached to a motorized cart-puller. Attached to the spindles is a retaining cord which extends around and engages the line of nested carts. The retaining cord is preferably slidable with respect to the nested carts to prevent the line of nested carts from binding when they turn. A hitch is also attached to the motorized cart-puller and has a set of stationary jaws and set of movable jaws which slidably engage the line of nested carts.

4 Claims, 9 Drawing Sheets

CART PULLER WITH RETAINING CORD MECHANISM

CROSS-REFERENCE TO RELATED APPLICATION(S)

This application claims the benefit of U.S. provisional Application No. 60/138,434 filed on May 18, 1999.

BACKGROUND OF THE INVENTION

The present invention relates to a shopping cart pulling system for moving a line of nested shopping carts. Particularly, the present invention relates to a reelable retaining cord mechanism and a hitch for engaging a line of carts.

When shopping in many types of stores, it is frequently necessary for the store to provide shopping carts for customers to place items that are to be purchased while the customer is selecting additional items. One type of store in which carts are typically used is supermarkets. After purchasing items, the customer typically uses the shopping cart to transport the purchased items to the customer's automobile. Once the purchased items are transferred from the shopping cart to the customer's automobile, the shopping carts are typically left in the parking lot or returned to a cart corral.

Employees of the store collect shopping carts on a regular basis and then return the shopping carts to the store for subsequent customers to use. To assist in returning the shopping carts to the store, the shopping carts are typically designed to partially nest inside each other so that a line of nested shopping carts may be simultaneously returned to the store.

A draw-back of simultaneous returning a line of nested shopping carts to the store is that a substantial amount of force must be used to move the line of nested shopping carts. The force needed to move the line of nested shopping carts becomes even greater when the parking lot is not level or when the parking lot is covered with snow and ice.

In many instances, employees become injured when moving the line of nested shopping carts. Typical injuries range from strained muscles to broken limbs. These types of injuries frequently lead to lost work or time for the employees and higher workers' compensation insurance premiums for the store.

To alleviate injuries to them, stores use motorized shopping cart moving devices to move the line of nested shopping carts back to the store. The prior art motorized shopping cart moving devices utilize a single reel retaining cord mechanism. This retaining cord mechanism was disadvantageous since either the tension was too great when the retaining cord was strung around the line of carts, or too little when the retaining cord was disengaged from the carts and reeled into the reel box.

Additionally, the prior art motorized shopping cart moving devices used an open jaw hitch to engage the line of carts. To engage or disengage the line of carts from the motorized cart mover, the operator had to manually lift the first cart onto or off of the open-jawed hitch. This increased the risk of injury to the operator.

BRIEF SUMMARY OF THE INVENTION

The present invention includes a pulling system for pulling a line of nested carts. The cart-pulling system includes a reelable retaining cord mechanism and a hitch for engaging a line of nested carts.

The reelable retaining cord mechanism is a dual spindle system that is attached to a motorized cart mover. The retaining cord is situated such that the retaining cord extends around and secures the line of nested carts. The retaining cord is preferably slidable with respect to the line of nested carts so that the nested carts do not bind when pulled into a turn with the motorized shopping cart puller.

The hitch is also attached to the motorized cart puller. The hitch includes a stationary set of jaws and a movable set of jaws. The moveable set of jaws slidably engage the lower bar of a cart. The cart is disengaged from the hitch when the movable set of jaws are moved.

DETAILED DESCRIPTION

Figure 1:
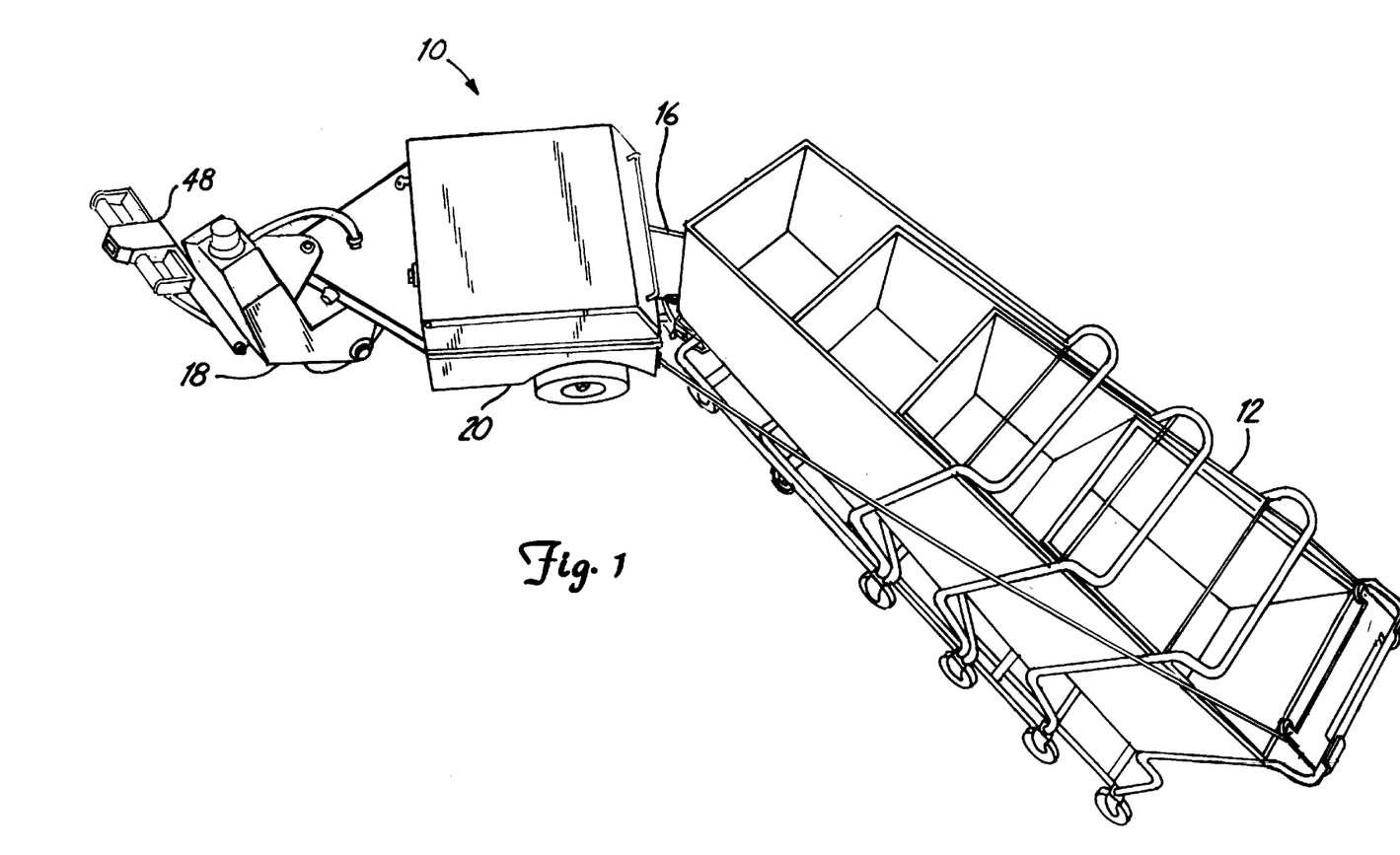
FIG. 1 is a perspective view of a motorized cart puller engaged with a line of nested carts.
Figure 2:
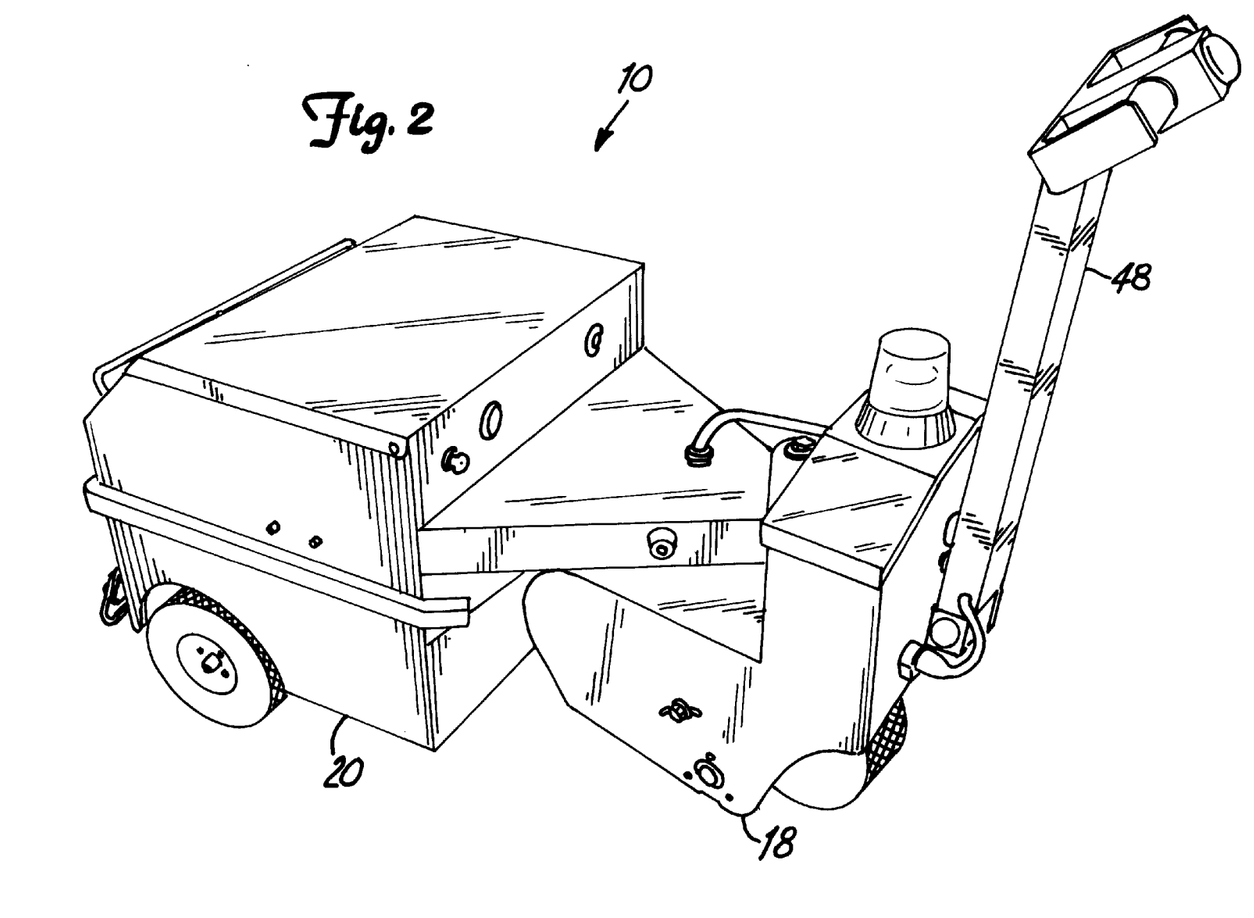
FIG. 2 is a perspective view of the motorized cart puller.

A cart pulling system according to the present invention is illustrated at 10 in FIGS. 1 and 2. The cart pulling system 10 is engaged with a line of nested carts 12 by way of a hitch 14, and a retaining cord 16 which is attached to the line of carts by a retaining bar 38. The cart pulling system 10 includes a motorized portion 18 and a reel box 20.

Figure 3:
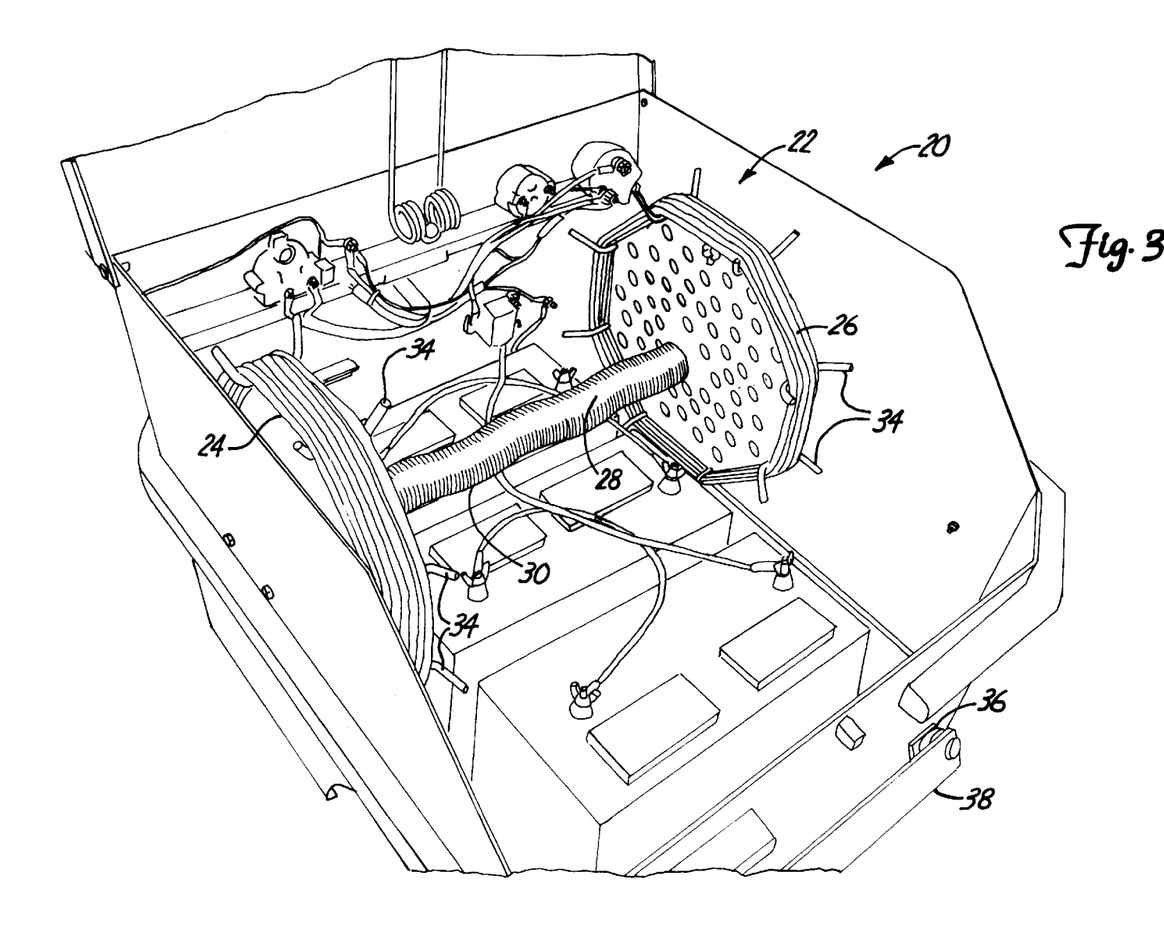
FIG. 3 is a perspective view of an interior of the reel box.
Figure 4:
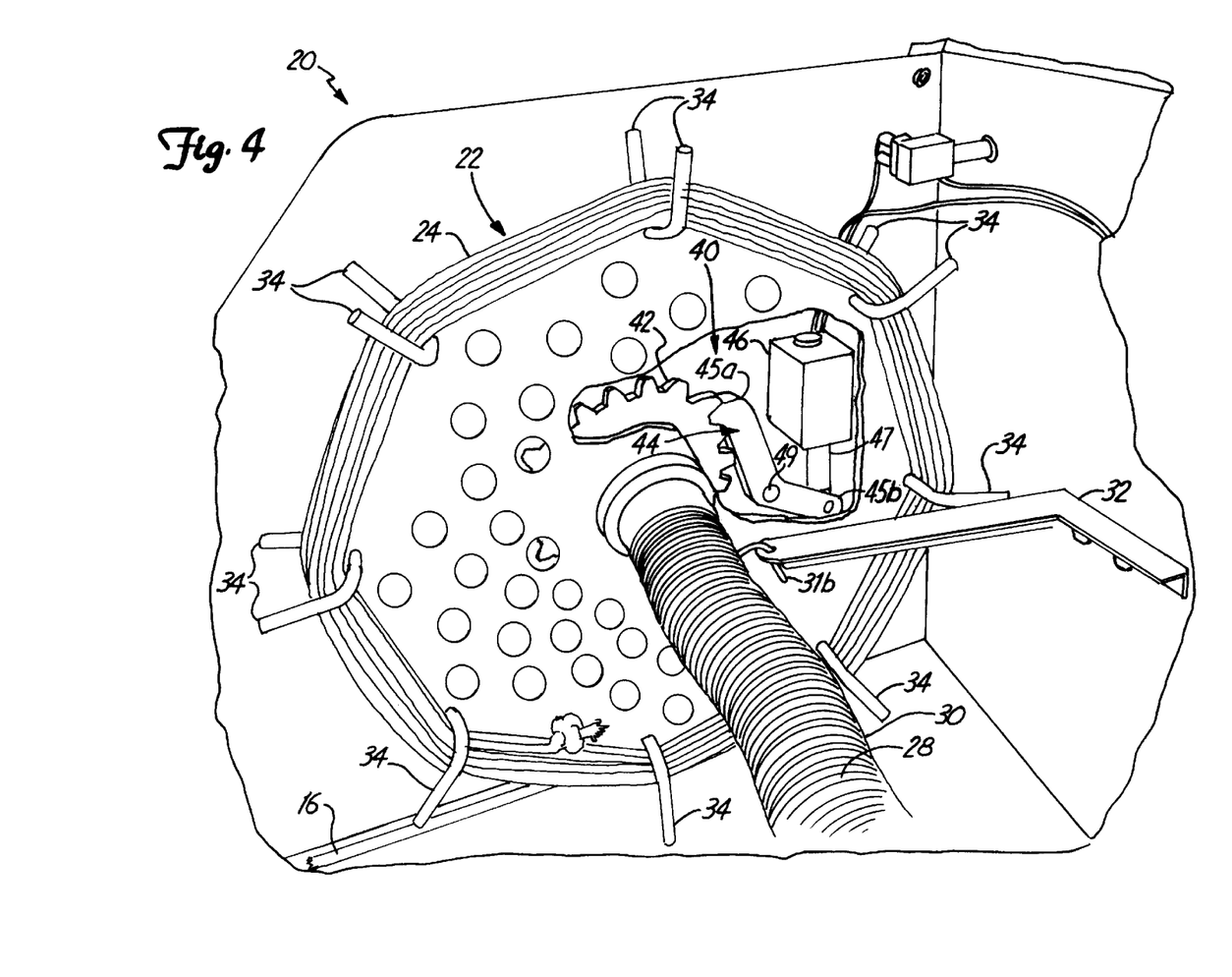
FIG. 4 is a perspective view illustrating a reel locking mechanism.

A reelable retaining cord mechanism 22 is disposed within the reel box 20 as illustrated in FIG. 3. The reel mechanism 22 is a dual spindle system that includes a left reel 24 and a right reel 26 attached to each other by a central shaft 28 such that the reels 24 and 26 rotate in a synchronous motion. A retraction coil spring 30 is disposed upon the central shaft 28. A proximate end 31*a* of the coil spring 30 is attached to the right reel 26. A distal end 31*b* of the coil spring 30 is attached to a coil spring bracket 32 as illustrated in FIG. 4. The coil spring bracket is attached to the reel box 20. When attached to the right reel 26 and the coil spring bracket 32, the coil spring 30 is in a state of tension.

Figure 8:
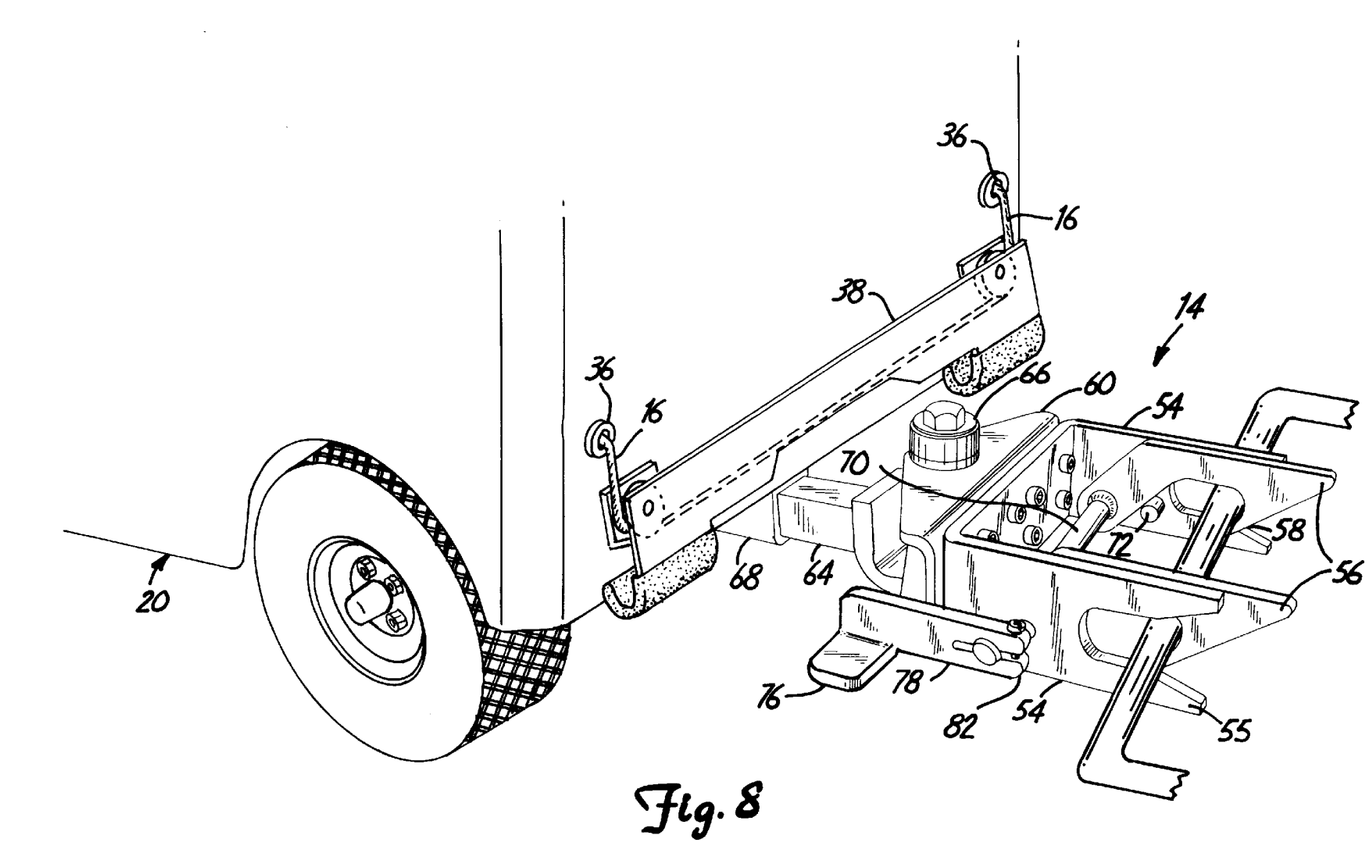
FIG. 8 is a perspective view of the hitching mechanism engaging a lower cross member of a grocery cart.

A plurality of spaced apart cord retaining fingers 34 are attached to the perimeter of each reel 24 and 26. The fingers 34 extend radially from each rim portion of each reel 24 and 26 as illustrated in FIG. 3. The retaining cord 16 enters and exits the reel box 20 through spaced apart apertures 36 which are aligned with the respective reels 24 and 26. The ends of the retaining cord 16 are attached to the reels 24 and 26. The retaining cord 16 also slidably engages the retaining bar 38, as illustrated in FIG. 8. It should be appreciated that drawing the cord 16 out of the reel box places the coil spring 30 in greater tension. The amount of force exerted on the cord 16 from the coil spring 30 is such that a person is able to comfortably withdraw the cord 16 and retainer bar 38 for securing a line of carts, and to retract the cord 16 back into the reel box 20.

When the cord 16 is withdrawn from the reel box 20 and secured around a line of carts 12. The cord 16 is held in a selected position by a locking mechanism 40. The locking mechanism 40 includes a gear 42, a dog 44, and a solenoid 46, as illustrated in FIG. 4. The gear 42 is attached to the central shaft 28. The dog 44 includes a distal end 45a and a proximate end 45b. The solenoid includes a connecting arm 47 and is controlled by a handle 48 attached to the motor unit 18. When the handle 48 is in an upright position, as illustrated in FIG. 2, the solenoid is deactivated. When the handle 48 is in a downward position (not shown) the solenoid is activated.

While activated, the solenoid 46 allows the connecting arm 47 to travel in an upward direction. The connecting arm 47 in turn acts upon the proximate end 45b of the dog 44. As the proximate end 45b travels in an upward direction, the dog pivots about a central pin 49, and the distal end 45a engages the teeth of the gear 42. This allows the gear 42, and thus the reels 24 and 26, to not rotate.

Figure 5:
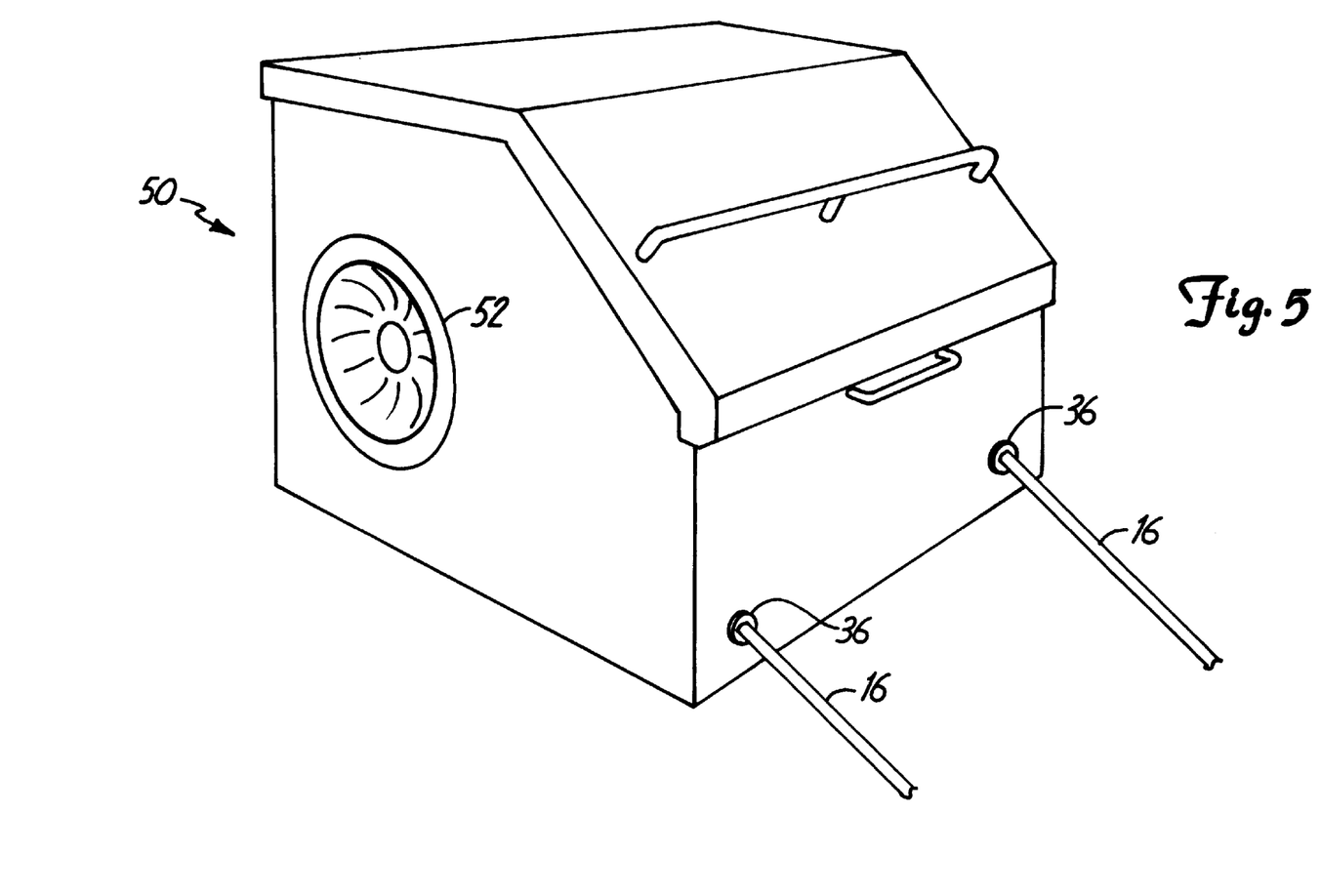
FIG. 5 is a perspective view of a stand-alone reel box of the present invention.

While deactivated, the solenoid 46 allows the connecting arm 47 to travel in a downward direction. In turn, the proximate end 45b also travels in a downward direction, the dog 44 pivots about the central pin 49, and the distal end 45a disengages the teeth of the gear 42. The gear 42 and the reels 24 and 26 are now allowed to rotate freely An alternative embodiment of the present invention includes a stand alone box 50 as illustrated in FIG. 5. The stand alone box 50 is designed to be attached to a motorized cart mover such as a CUSHMAN® cart. The stand alone box 50 contains the dual spindle reel mechanism 22, locking mechanism 40, retaining chord 16, and apertures 36 as previously described with respect to FIGS. 1 through 4. In addition, a hand reel 52 is located on an outside of the stand alone box 50. The hand reel 52 is attached to the central shalt 28, such that it rotates the shaft 28, and is used as an option to manually rotate the reels 24 and 26 to either take in the retaining cord 16. The hand reel 52 may also be used to adjust the amount of tension applied to the retaining cord 16 before the locking mechanism 40 is activated.

Figure 6:
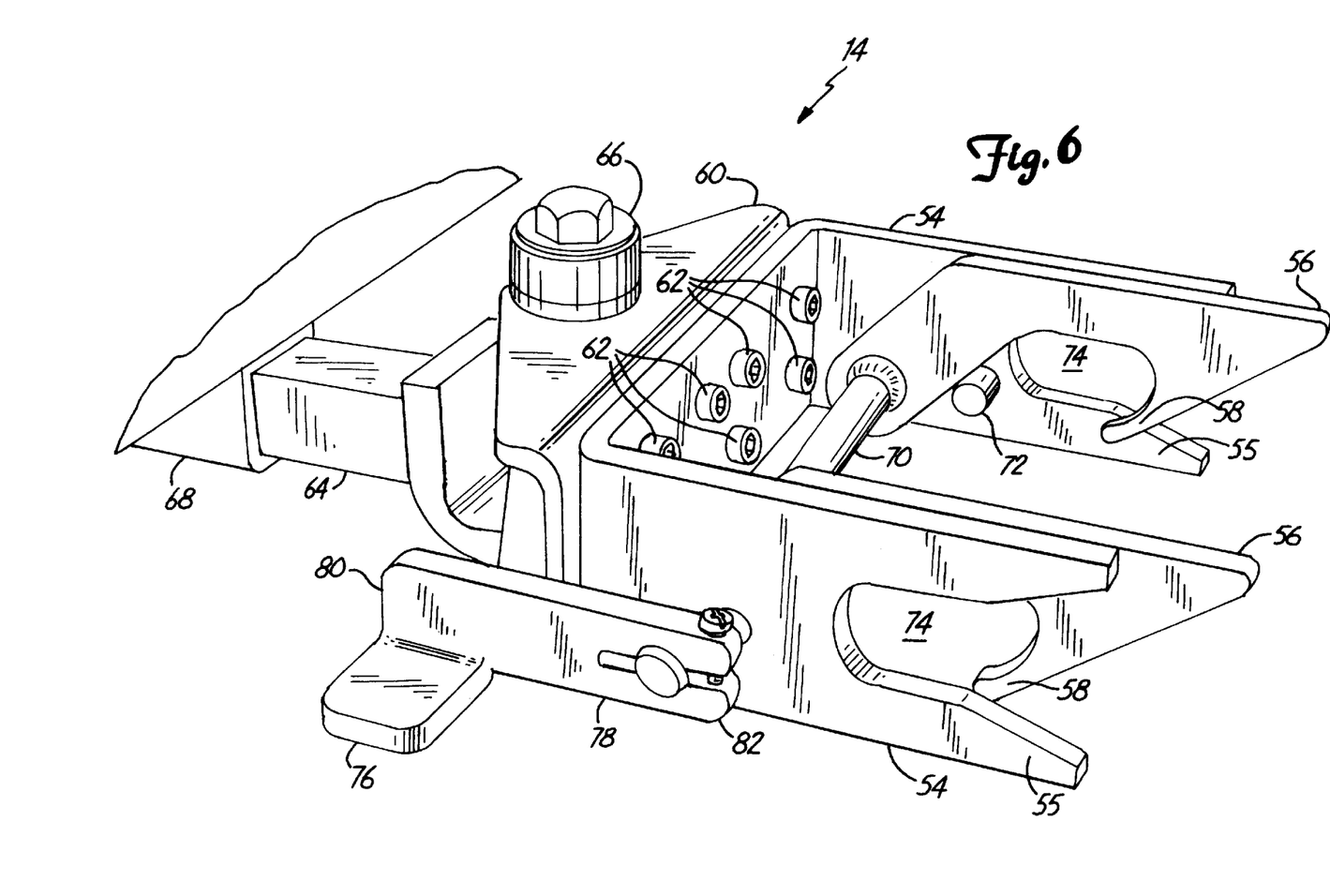
FIG. 6 is a perspective view of the hitching mechanism in a closed position.
Figure 7:
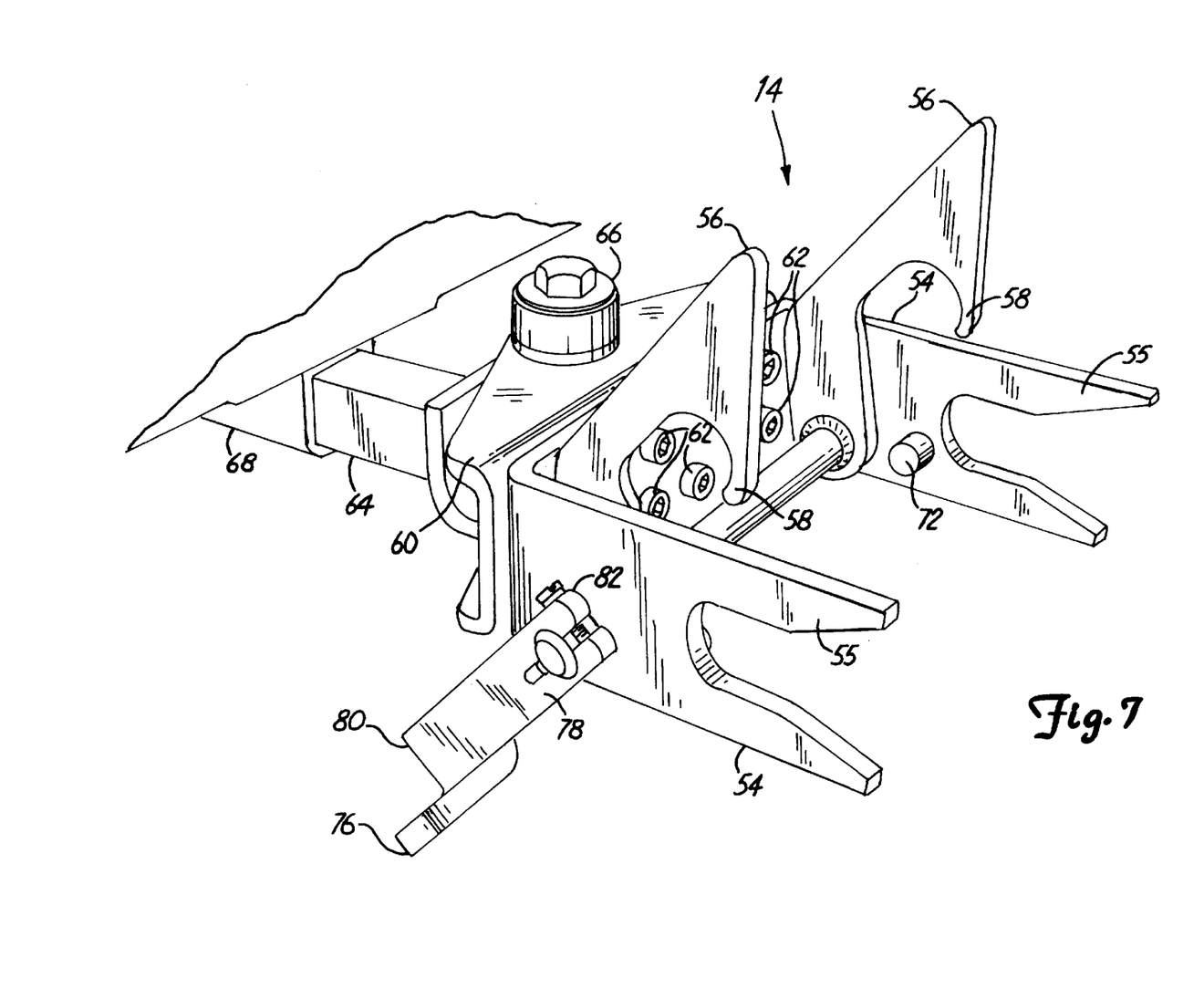
FIG. 7 is a perspective view of the hitching mechanism in an open position.

The hitch 14, as illustrated in FIGS. 6, 7, and 8, includes a lower set of jaws 54 and an upper set of jaws 56. The lower set of jaws 54 are "U"-shaped having spaced apart forked ends 55. The jaws 54 are connected to a mounting bracket 60 by a plurality of screws 62, and are thus stationary with respect to the mounting bracket 60. The mounting bracket 60 is pivotally connected to an arm 64 by a bolt 66. The arm 64 is inserited into the receiving unit 68. The receiving unit 68 in turn is attached to the reel box 20. It should be appreciated that since the lower set of stationary jaws 54 are pivotally connected to the reel box 20, the entire hitch 14 rotates about a vertical axis through the bolt 66 such that the hitch 14 swivels with the line of carts 12 when the cart moving device 10 is turning.

The upper set of jaws 56 are connected to each other by a central shaft 70. The central shaft 70 is rotatably attached to the lower jaws 54 by extending through suitable apertures located in the lowers jaws 54. The upper jaws 56 thereby are movable to an upward (open) position as illustrated in FIG. 7, and to a lowered (closed) position as illustrated in FIG. 6.

Figure 9:
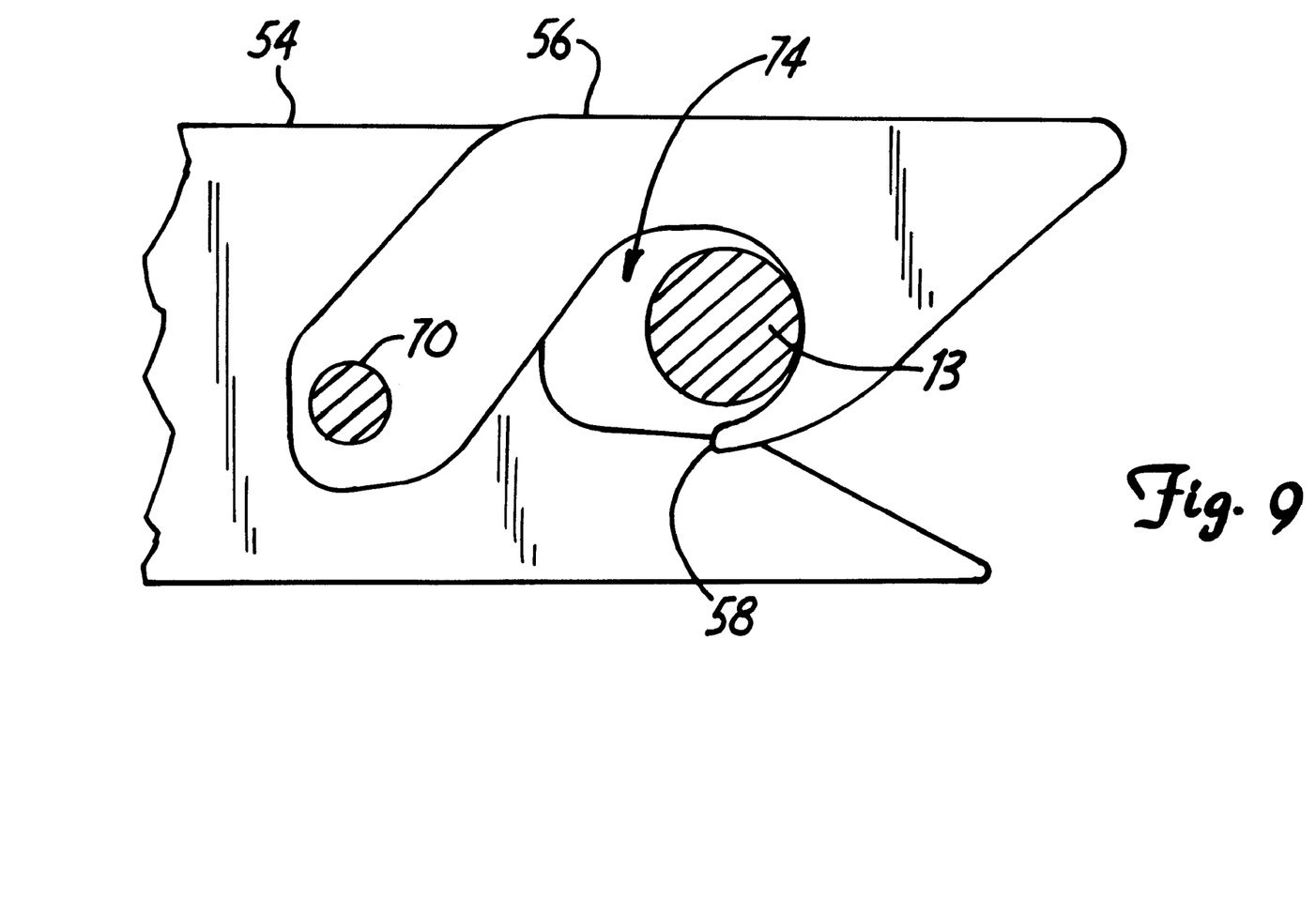
FIG. 9 is a cross-sectional view of the hitching mechanism engaging the lower cross member of the grocery cart.

To engage the hitch with a front cart in a line of nested carts, the cart moving system 10 travels toward the line of carts 12 so that the lower cross member 13 of the front cart engages a downwardly facing surface of a forward portion of the upper jaws 56, moving the upper jaws 56 in an upward direction. After the lower cross member of the cart 13 moves past an extension 58 located on the upper jaws 56, gravity permits the upper jaws 56 to travel in a downward direction to the closed position. A nub 72 is attached to the lower jaws 54 to stop the downward travel of the upper jaws 56. The upper jaws 56 remain in the closed position until released. It will be appreciated that the lower cross member 13 is then retained within the openings 74 that are formed between the lower jaws 54 and the upper jaws 56. Furthermore, it should be also appreciated that, while engaged with the lower cross member 13, movement of the upper jaws 56 in an upward vertical direction is not permitted. Once the cart moving device 10 has begun forward motion, the lower cross member 13 engages both the upper jaws 56 and the extension 58 as illustrated in FIG. 9. The addition of the extension 58 does not permit the upper jaws 56 to rotate in an upward vertical direction.

To release the line of carts 12 from the hitch 14, the lower cross member is positioned forward of the extension 58 of the upper jaws 56 and a foot pedal 76 is depressed. Referring to FIG. 7, the foot pedal 76 is attached to a foot pedal lever 78. The foot pedal lever 78 has a distal end 80 and a proximate end 82. The foot pedal 76 is attached to the distal end 80, and the proximate end 82 is fixedly attached to the central shalt 70 such that the foot pedal lever 78 rotates the shaft 70. When the foot pedal 76 is depressed, the upper jaws 56 move in an upward direction, thereby releasing the cart.

Although the present invention has been described with reference to preferred embodiments, workers skilled in the art will recognize that changes may be made in form and detail without departing from the spirit and scope of the invention.

What is claimed is:

1. A cart moving system for moving a line of carts that includes at least one cart comprising:

a motorized cart mover for engaging the line of carts;

at least two rotatable reels disposed within the motorized cart mover;

a common shaft each reel fixedly attached thereto the shaft rotatable attached to the cart mover;

a retaining cord at least partially disposed on the reels such that the retaining cord is extendible to a selected position around the line of carts; and a locking mechanism which secures remaining cord in the selected position.

2. The cart moving system of claim 1, wherein the locking mechanism comprises:

a gear attached to either reel;

a dog which slidably engages the gear; and a solenoid that activates the dog to engage the gear.

3. The cart moving system of claim 1, and further comprising:

a retraction coil spring attached to the shaft; and a coil spring bracket attached to the retraction coil spring and secured to the cart mover.

4. The cart moving system of claim 1, and further comprising:

a plurality of spaced apart cord retaining fingers attached to the perimeter of the each reel.

* * * * *

UNITED STATES PATENT AND TRADEMARK OFFICE
CERTIFICATE OF CORRECTION

PATENT NO.     : 6,260,643 B1
DATED          : July 17, 2001
INVENTOR(S)    : Peter W. Schuchardt It is certified that error appears in the above-identified patent and that said Letters Patent is hereby corrected as shown below:

Column 2,
Line 67, delete "12. The", insert -- 12, the --

Column 3,
Line 32, delete "shalt", insert -- shaft --
Line 45, delete "inserited", insert -- inserted --

Column 4,
Line 25, delete "shalt", insert -- shaft --
Line 40, delete "rotatable" insert -- rotatably --

Signed and Sealed this

Fourth Day of June, 2002

*Attest:*

JAMES E. ROGAN
*Director of the United States Patent and Trademark Office*

*Attesting Officer*